United States Patent
Hasuo et al.

(10) Patent No.: US 10,170,962 B2
(45) Date of Patent: Jan. 1, 2019

(54) LAMINATED IRON CORE AND MANUFACTURING METHOD OF LAMINATED IRON CORE

(71) Applicant: MITSUI HIGH-TEC, INC., Kitakyushu-shi, Fukuoka (JP)

(72) Inventors: Yusuke Hasuo, Fukuoka (JP); Toyoshi Odahara, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 279 days.

(21) Appl. No.: 14/868,937

(22) Filed: Sep. 29, 2015

(65) Prior Publication Data
US 2016/0099615 A1 Apr. 7, 2016

(30) Foreign Application Priority Data

Oct. 3, 2014 (JP) .................................. 2014-204787

(51) Int. Cl.
*H02K 1/06* (2006.01)
*H02K 15/02* (2006.01)
(Continued)

(52) U.S. Cl.
CPC ........... *H02K 15/02* (2013.01); *B29C 70/845* (2013.01); *F16B 11/006* (2013.01); *H02K 15/12* (2013.01); *B29L 2009/003* (2013.01); *H02K 1/06* (2013.01)

(58) Field of Classification Search
None
See application file for complete search history.

(56) References Cited

U.S. PATENT DOCUMENTS

| 2003/0151327 A1* | 8/2003 | Ramirez | ................. H02K 1/16 310/216.062 |
| 2006/0103251 A1* | 5/2006 | Taniguchi | ............. H02K 1/276 310/156.01 |

(Continued)

FOREIGN PATENT DOCUMENTS

| CN | 102112249 | 6/2011 |
| CN | 103081317 | 5/2013 |

(Continued)

OTHER PUBLICATIONS

Office Action issued in China Counterpart Patent Appl. No. 201510645110.8, dated Feb. 24, 2018, along with an English translation thereof.

*Primary Examiner* — Thomas Truong
(74) *Attorney, Agent, or Firm* — Greenblum & Bernstein, P.L.C.

(57) ABSTRACT

A laminated iron core includes laminated iron core pieces, in which coupling parts are formed so as to communicate in a lamination direction of the laminated iron core pieces, and the coupling parts are filled with resins. The laminated iron core satisfies the following formula: $(T \times S)/\eta > \{(4 \times E \times \delta \times w \times t^3)/L^3\} \times n$, where T is a strength (N/mm$^2$) of the resin; S is a cross-sectional area (mm$^2$) of the coupling part or the resin; E is a Young's modulus (N/mm$^2$) of the strip material; $\delta$ is a distortion amount (mm) of the iron core piece; w is a width (mm) of the iron core piece in a radial direction; t is a plate thickness (mm) of the iron core piece; n is the number of laminated iron core pieces; L is a distance (mm) between the coupling parts adjacent in the circumferential direction; and $\eta$ is a safety factor.

10 Claims, 5 Drawing Sheets

(51) Int. Cl.
    *B29C 70/84*    (2006.01)
    *F16B 11/00*    (2006.01)
    *H02K 15/12*    (2006.01)
    *B29L 9/00*     (2006.01)

(56) References Cited

U.S. PATENT DOCUMENTS

2011/0174125 A1    7/2011    Funabiki et al.
2012/0156441 A1    6/2012    Gerster et al.
2013/0228280 A1    9/2013    Hirayama et al.
2014/0124980 A1    5/2014    Nagai et al.
2016/0268856 A1*   9/2016    Oketani .............. H02K 1/276
2016/0352198 A1    12/2016   Hirayama et al.

FOREIGN PATENT DOCUMENTS

| CN | 103812285   | 5/2014  |
|----|-------------|---------|
| JP | 2003-529309 | 9/2003  |
| JP | 2007-300795 | 11/2007 |
| WO | 01/73924    | 10/2001 |
| WO | 2010/109272 | 9/2010  |

\* cited by examiner

LAMINATED IRON CORE AND MANUFACTURING METHOD OF LAMINATED IRON CORE

CROSS REFERENCE TO RELATED APPLICATION(S)

This application is based upon and claims the benefit of priority of Japanese Patent Application No. 2014-204787 filed on Oct. 3, 2014, the contents of which are incorporated herein by reference in its entirety.

BACKGROUND OF THE INVENTION

1. Field of the Invention

The present invention relates to a laminated iron core in which iron core pieces adjacent in a lamination direction are mutually coupled using a resin, and a manufacturing method of the laminated iron core.

2. Description of the Related Art

In manufacture of a laminated iron core, generally, iron core pieces adjacent in a lamination direction are mutually bonded using caulking or welding from the standpoint of cost or ease of manufacture, but there are problems of, for example, a decrease in an occupancy rate of area or an increase in iron loss due to a short circuit between the iron core pieces.

Hence, a method for mutually bonding iron core pieces by filling a through hole or a recess formed so as to communicate in a lamination direction of a laminated iron core with a resin is proposed (for example, see JP-T-2003-529309 or WO 2001/073924 A2 as Patent Reference 1). Accordingly, for example, efficiency or torque of a motor can be improved.

Also, a strip material from which the iron core piece is blanked is thinned in order to improve performance of the motor.

Patent Reference 1: JP-T-2003-529309 (WO 2001/073924 A2)

SUMMARY OF THE INVENTION

Figure 4A:
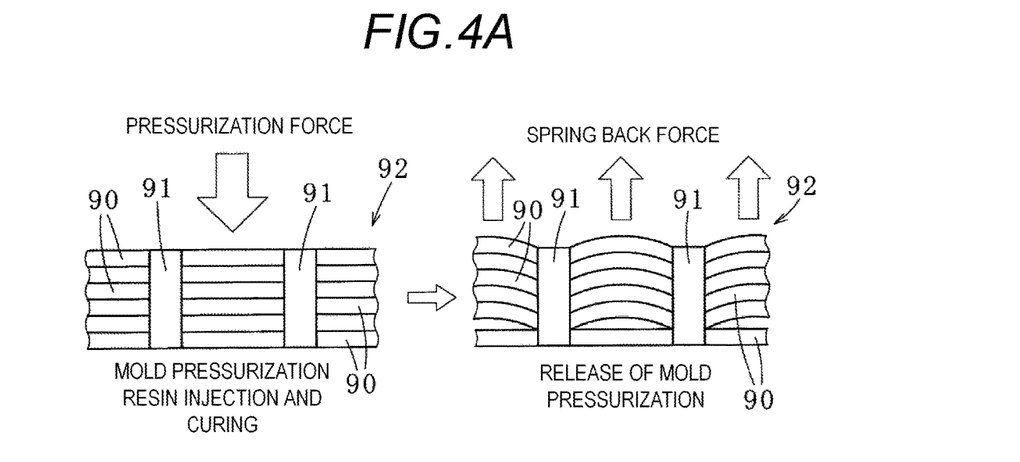
FIG. 4A is an explanatory diagram showing a state in which a laminated iron core bonded with a resin by pressurization using a die unit is taken out of the die unit and the pressurization is released and thereby a spring back occurs.
Figure 4B:
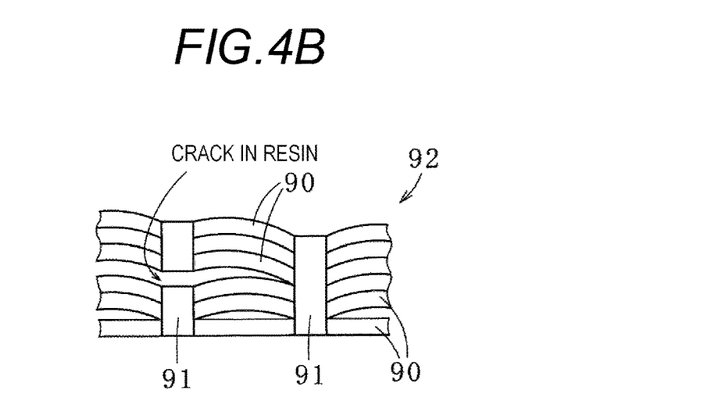
FIG. 4B is an explanatory diagram showing a state in which the resin is cracked due to the occurrence of the spring back.

However, thinning of the strip material tends to increase a distortion (warp) in the strip material, with the result that a distortion (warp) in the iron core piece blanked from the strip material is also increased. As a result, as shown in FIG. 4A, in a laminated iron core 92 after plural iron core pieces 90 are bonded by a resin 91 (after release of mold pressurization), stress acts on the bonded resin 91 by a spring back force due to the distortion and as shown in FIG. 4B, the resin 91 may be fractured to crack the resin.

As a result, problems such as poor assembly of the motor, breakage, noise or vibration at the time of driving arise.

In addition, there is a method for simultaneously blanking plural iron core pieces with plural strip materials stacked for the purpose of improving productivity, but in this case, the distortion in the iron core piece tends to be more increased.

The present invention has been implemented in view of such circumstances, and a non-limited object of one or more aspects of the present invention is to provide a laminated iron core capable of preventing a crack in a coupling resin resulting from a distortion in an iron core piece, and a manufacturing method of the laminated iron core.

A first aspect of the present invention provides a laminated iron core including: a plurality of laminated iron core pieces, each iron core piece formed and blanked from a strip material; and a plurality of coupling parts including through holes or recesses formed in a circumferential direction of the plurality of laminated iron core pieces so as to communicate in a lamination direction of the plurality of laminated iron core pieces, wherein the coupling parts are filled with resins to mutually couple the iron core pieces adjacent in the lamination direction, and the laminated iron core satisfies the following formula: $(T \times S)/\eta > \{(4 \times E \times \delta \times w \times t^3)/L^3\} \times n$, where T is a strength ($N/mm^2$) of the resin; S is a cross-sectional area ($mm^2$) of the coupling part or the resin; E is a Young's modulus ($N/mm^2$) of the strip material; $\delta$ is a distortion amount (mm) of the iron core piece; w is a width (mm) of the iron core piece in a radial direction; t is a plate thickness (mm) of the iron core piece; n is the number of laminated iron core pieces; L is a distance (mm) between the coupling parts adjacent in the circumferential direction; and $\eta$ is a safety factor.

The laminated iron core may be configured such that the iron core pieces are blanked simultaneously, with a plurality of strip materials stacked.

The laminated iron core may be configured such that the coupling parts are through holes formed through a yoke of the laminated iron core.

The laminated iron core may be configured such that the coupling parts are recesses formed at a radial outside or inside of the laminated iron core.

The laminated iron core may be configured such that the coupling parts are winding slots formed between magnetic pole parts of the laminated iron core, and the resin is applied on a surface of the winding slots as a resin layer, and in the formula, S is a cross-sectional area ($mm^2$) of the resin layer.

A second aspect of the present invention provides a manufacturing method of a laminated iron core, the method including: blanking and laminating a plurality of laminated iron core pieces from a strip material; forming a plurality of coupling parts including through holes or recesses in a circumferential direction of the plurality of laminated iron core pieces so as to communicate in a lamination direction of the laminated iron core pieces; and filling the coupling parts with resins to mutually couple the iron core pieces adjacent in the lamination direction, wherein one or more of a kind of the resin, a material of the iron core piece and a shape of the iron core piece are set so as to satisfy the following formula: $(T \times S)/\eta > \{(4 \times E \times \delta \times w \times t^3)/L^3\} \times n$, where T is a strength ($N/mm^2$) of the resin; S is a cross-sectional area ($mm^2$) of the coupling part or the resin; E is a Young's modulus ($N/mm^2$) of the strip material; $\delta$ is a distortion amount (mm) of the iron core piece; w is a width (mm) of the iron core piece in a radial direction; t is a plate thickness (mm) of the iron core piece; n is the number of laminated iron core pieces; L is a distance (mm) between the coupling parts adjacent in the circumferential direction; and $\eta$ is a safety factor.

The manufacturing method of the laminated iron core may be configured such that the iron core pieces are blanked simultaneously, with a plurality of strip materials stacked.

The manufacturing method of the laminated iron core may be configured such that the coupling parts are through holes formed through a yoke of the laminated iron core.

The manufacturing method of the laminated iron core may be configured such that the coupling parts are recesses formed at a radial outside or inside of the laminated iron core.

The manufacturing method of the laminated iron core may be configured such that the coupling parts are winding slots formed between magnetic pole parts of the laminated iron core, and the resin is applied on a surface of the winding slots as a resin layer, and in the formula, S is a cross-sectional area (mm²) of the resin layer.

Since the laminated iron core and the manufacturing method of the laminated iron core according to the aspects of the present invention use the formula described above, a relation between a withstand load of the resin with which the coupling part is filled and a reaction force by a distortion occurring in the iron core piece can be grasped previously. Consequently, the laminated iron core with high quality can be obtained since a crack in the resin resulting from the distortion in the iron core piece can be prevented by satisfying the relation of the formula described above.

DETAILED DESCRIPTION OF THE EXEMPLARY EMBODIMENTS

Subsequently, an embodiment embodying the present invention will be described with reference to the accompanying drawings, and the present invention will be understood.

Figure 1A:
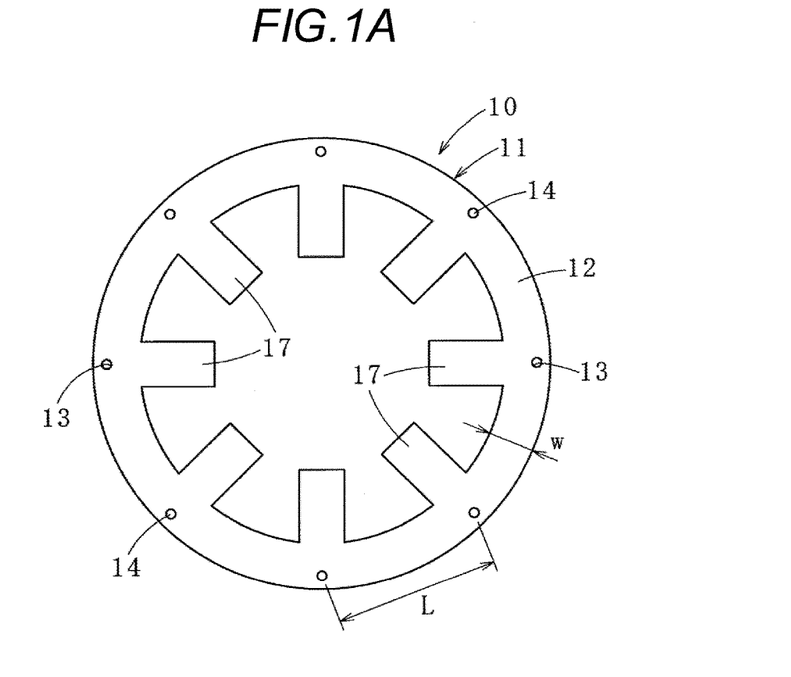
FIG. 1A is a plan view of a laminated iron core according to one embodiment of the present invention.
Figure 1B:
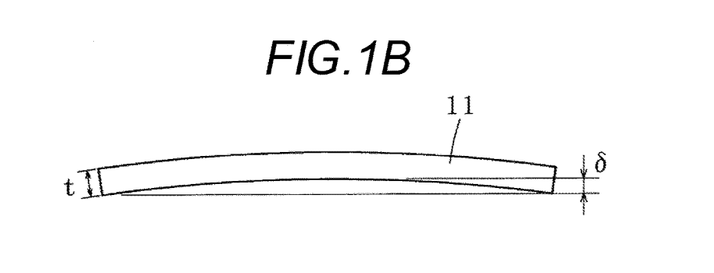
FIG. 1B is a sectional side view of an iron core piece constructing the same laminated iron core.

As shown in FIGS. 1A and 1B, a laminated iron core 10 according to one embodiment of the present invention is a stator laminated iron core (stator), and a through hole (one example of a coupling part) 13 formed so as to communicate in a lamination direction of a yoke 12 of plural laminated iron core pieces 11 blanked from a strip material is filled with a resin 14 to mutually couple the iron core pieces 11 adjacent in the lamination direction, and a crack in the resin 14 resulting from a distortion (warp) in the iron core piece 11 is prevented. Hereinafter, detailed description will be made.

The iron core piece 11 constructing the laminated iron core 10 has an annular integral structure. In addition, the iron core piece may have a divided structure capable of annularly joining plural circularly arcuate iron core piece parts.

This iron core piece 11 is blanked and formed from the strip material made of, for example, an amorphous material or an electromagnetic steel plate with a thickness of, for example, about 0.10 to 0.5 mm, and as the thickness of the strip material is thinner (about 0.2 mm or less), a distortion amount tends to become large.

Also, the iron core piece 11 is blanked and formed from one strip material, but may be blanked from plural (for example, two, or three or more) stacked strip materials, and in this case, the distortion amount tends to become larger.

Figure 2:
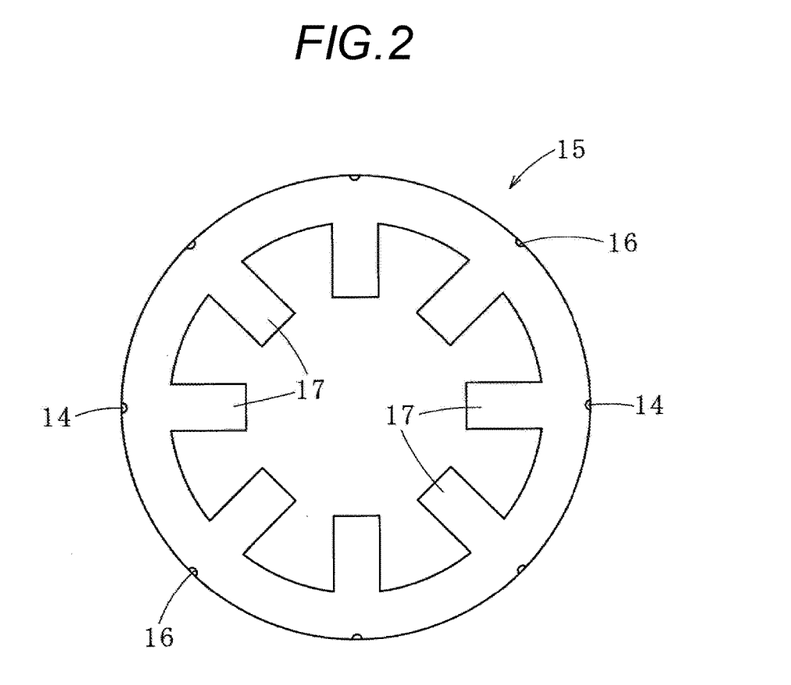
FIG. 2 is a plan view of a laminated iron core according to a modified example.

The through hole 13 is filled with the resin 14 to mutually couple the iron core pieces 11 adjacent in the lamination direction. Alternatively, as shown in FIG. 2, a radial outside of a laminated iron core 15 can also be circumferentially provided with plural recesses (one example of the coupling part) 16 formed so as to communicate in the lamination direction, and each of the recesses 16 can be filled with the resin 14 to couple the iron core pieces 11. In addition, a radial inside of the laminated iron core can be formed with the recesses filled with the resins.

Also, the iron core pieces can be mutually coupled by combining two or more of the through hole 13, the recess 16 of the radial outside, and the recess of the radial inside described above. Further, coupling by one or both of caulking and welding can be combined with coupling by the resin.

The through hole 13 has a circular cross section, and the plural (eight herein) through holes 13 are formed at equal pitches in a circumferential direction of the laminated iron core 10. In addition, the shape of the through hole 13 is not limited to the circular cross section, and can also be formed in, for example, an elliptic cross section or a polygonal cross section.

The number of through holes 13 becomes equal to the number of magnetic pole parts 17, but the through holes 13 with the number smaller than the number of magnetic pole parts 17 may be formed at equal distances in the circumferential direction and also, the number of through holes 13 may be the integral multiple of the number of magnetic pole parts 17.

Also, in consideration of an influence on a flow of magnetic flux (decrease in efficiency of the iron core), a cross-sectional area of the through hole 13 could be smaller, for example, about 10 mm² or less, but as long as the shape of the through hole 13 is changed into a shape with a small influence on the flow of magnetic flux, the cross-sectional area of the through hole 13 is not limited.

Shapes, specific positions and the number of recesses 16 are not limited to those shown in FIG. 2, but the same applies to the recesses 16 as well as the through holes 13 described above.

As the resin 14 with which the through hole 13 is filled, a thermosetting resin (for example, an epoxy resin) is used, but a thermoplastic resin can also be used.

In addition, a resin in which strength is increased (durability is given) by adding a filler (filling material) to these resins can be used.

The laminated iron core 10 described above satisfies the following formula.

$$(T \times S)/\eta > \{(4 \times E \times \delta \times w \times t^3)/L^3\} \times n \tag{1}$$

Here, T is a strength (N/mm²=MPa) of the resin, S is a cross-sectional area (mm²) of the coupling part, E is a Young's modulus (N/mm²=MPa) of the strip material, δ is a distortion amount (mm) of the iron core piece, w is a width (mm) of the iron core piece in a radial direction (yoke), t is a plate thickness (mm) of the iron core piece, n is the number of laminated iron core pieces, L is a distance (mm) between the coupling parts adjacent in the circumferential direction, and η is a safety factor.

"(T×S)" in the left side in the formula (1) indicates a withstand load of the resin, and this withstand load is divided by the safety factor η and thereby, the withstand load F of the resin capable of stably preventing a crack in the resin even when a distortion occurs in the iron core piece can be set. Consequently, the safety factor η could be more than 1, and could be set in the range of, for example, 2 to 3.

Also, the right side in the formula (1) is a reaction force W of the iron core piece by the distortion, and is a formula capable of being calculated from a force necessary to generate the distortion amount δ. In addition, this formula can be obtained from a calculation formula of a second moment of area using a model shown in FIGS. 1A and 1B.

Consequently, the laminated iron core 10 without the crack in the resin can be obtained by setting the left side larger than the right side (F>W) as shown in the formula (1).

In addition, for the above reason, the left side has only to be larger than the right side in the formula (1), with the result that an upper limit value of the left side is not particularly specified. However, a worse influence is exerted on the flow of magnetic flux as the cross-sectional area of the through hole is larger, and a special resin must be used as the strength of the resin is increased (a manufacturing cost is increased), with the result that the left side "(T×S)/η" could be set at a value three times or less, preferably, two times or less the right side "$\{(4 \times E \times \delta \times w \times t^3)/L^3\} \times n$".

Figure 3:
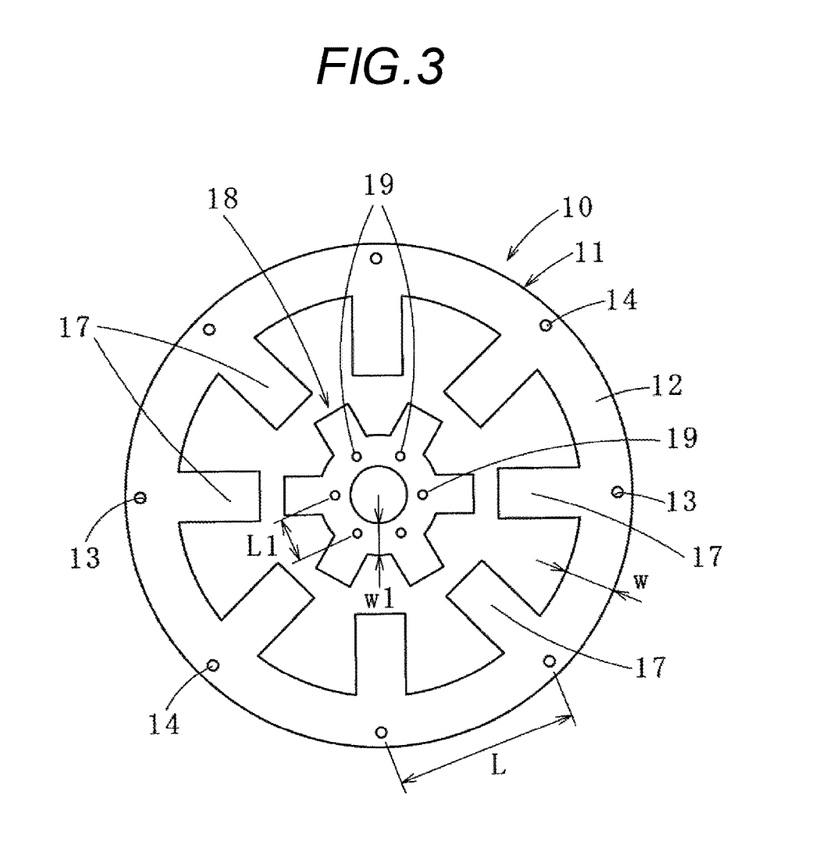
FIG. 3 is a plan view of a laminated iron core according to another embodiment of the present invention.

The case where the laminated iron core is the stator laminated iron core (stator) of an electric motor of an inner rotor type in which a rotor laminated iron core is arranged in the inside diameter side is described above, but a laminated iron core 18 as shown in FIG. 3, that is, a rotor laminated iron core (rotor) of a reluctance motor may be used. Also in this case, calculation can be made using a width w1 (mm) of a yoke and a distance L1 (mm) between through holes (one example of a coupling part) 19 adjacent in the circumferential direction like the stator described above.

Similarly, the formula (1) can be applied to a rotor or a stator of an electric motor of an outer rotor type.

Also in these laminated iron cores, the adjacently laminated iron core pieces are mutually coupled by the coupling part (that is, one or more of the through hole, the recess of the radial outside, and the recess of the radial inside) formed so as to communicate in the lamination direction, and further, the iron core pieces are coupled by combining one or both of caulking and welding with this coupling by the resin.

Also, the formula (1) described above can be applied to a rotor of a stepping motor or an inner rotor having a permanent magnet, and can further be applied to an axial gap motor in which a rotor and a stator are arranged in a rotational axial direction. In these cases, there are no definite portions corresponding to the widths w, w1 of the iron core pieces constructing the laminated iron cores in the radial direction (yoke), but values corresponding to the widths w, w1 could be used based on a shape (core design) of the iron core piece, for example, 20% to 80% of the distances L, L1 (mm) between the coupling parts adjacent in the circumferential direction.

Figure 5:
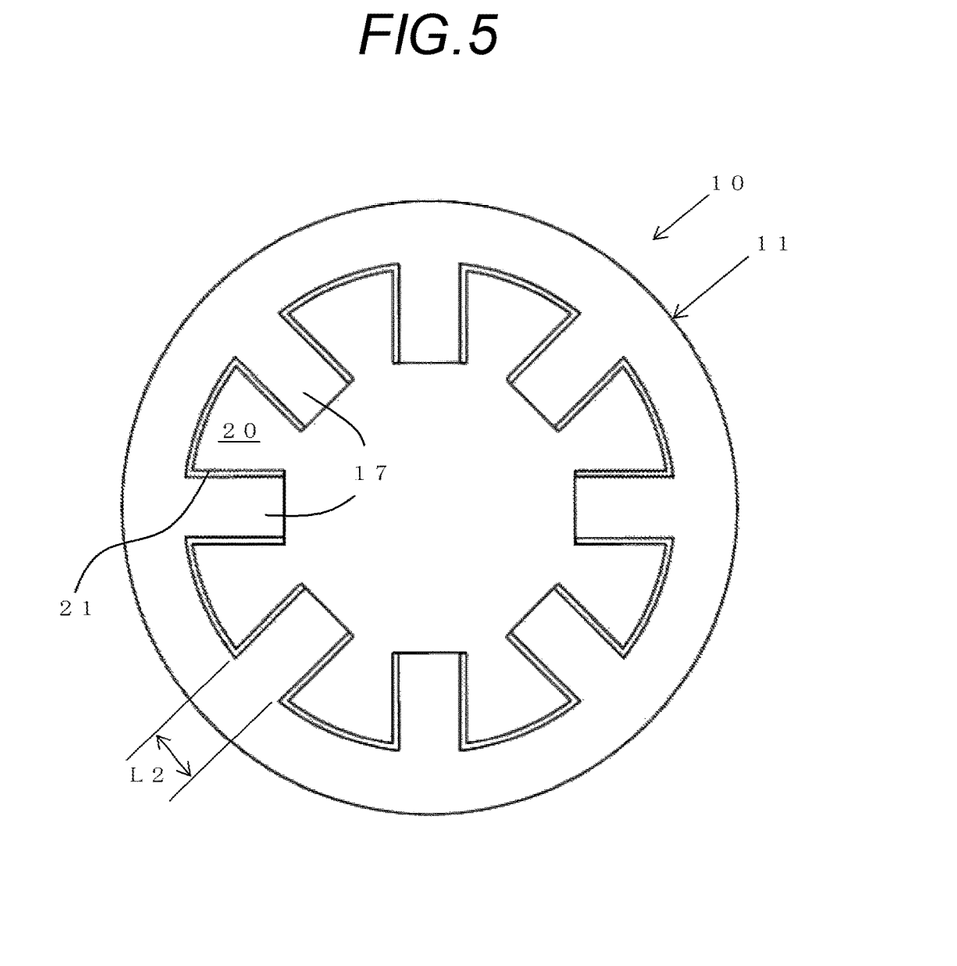
FIG. 5 is a plan view of a laminated iron core according to another embodiment of the present invention.

Alternatively, the formula (1) described above can be applied to an embodiment as shown in FIG. 5. In the above embodiments, the through holes or recesses are formed as coupling parts. However, winding slots 20 between the adjacent magnetic pole part (teeth) 17 can be considered as recesses of the coupling parts, and a resin layer 21 is formed on a surface of the winding slots 20, thereby mutually coupling the iron core pieces 11 adjacent in the lamination direction.

In this case, the formula (1) is used assuming that the distance L between the coupling parts is replaced with the width L2 of the magnetic pole part (teeth) 17, and cross-sectional area S of the coupling part is replaced with the cross-sectional area S2 of the resin layer 21.

The resin layer not only serves as the coupling part, but also serves as an insulator between the windings and the laminated iron core. Thus, it is not necessary to provide an insulating paper or another insulating member at the time of winding.

Subsequently, a manufacturing method of the laminated iron core according to one embodiment of the present invention will be described with reference to FIGS. 1A and 1B.

First, one or more of a kind of resin 14, a material of the iron core piece 11 and a shape (core design) of the iron core piece 11 are set so as to satisfy the formula (1) described above. This setting work is done using, for example, a computer (computing means) based on product requirement specifications or actual result values.

The setting conditions described above will be described below.

The kind of resin 14 means a resin with a different strength T, and this strength T can be adjusted variously by, for example, selecting a kind of thermosetting resin or thermoplastic resin and also adjusting a kind, a shape or a quantity of a filler etc. added to these resins.

Also, the material of the iron core piece 11 means the Young's modulus E of the strip material (iron core piece) or the distortion amount δ of the iron core piece, and can be adjusted variously by selecting, for example, processing conditions (for example, the presence or absence of annealing or a blanking method) or quality (manufacturing conditions of, for example, heat treatment or chemical ingredients of a film or a base material) of the strip material (electromagnetic steel plate etc.).

And, the shape of the iron core piece 11 means the cross-sectional area S of the coupling part, the width w of the iron core piece in the radial direction, the plate thickness t of the iron core piece, the number n of laminated iron core pieces and the distance (hereinafter also called the distance between the coupling parts) L between the coupling parts adjacent in the circumferential direction, and can be adjusted variously based on, for example, product requirement specifications.

In addition, when one or more of the kind of resin 14, the material of the iron core piece 11 and the shape (core design) of the iron core piece 11 are set so as to satisfy the formula (1) described above, one or more of the various conditions included in the setting conditions described above could be adjusted.

Based on the setting conditions described above, the laminated iron core 10 is manufactured by the following method.

First, the plural iron core pieces 11 are blanked from the strip material made of an electromagnetic steel plate with a thickness of, for example, about 0.10 to 0.5 mm (further, 0.2 mm or less), and are laminated. In addition, the iron core pieces 11 are blanked from one strip material, but the plural iron core pieces may be simultaneously blanked from plural (for example, two, or three or more) stacked strip materials.

Then, after the through hole 13 formed in the lamination direction of the laminated iron core pieces 11 is filled with the resin 14, the resin 14 is further cured to mutually couple the iron core pieces 11 adjacent in the lamination direction. In addition, in the laminated iron core 15 shown in FIG. 2, after an outer peripheral surface of the laminated iron core 15 is provided with a dam and the inside of the recess 16 is filled with the resin 14, this resin 14 is cured (the same applies to the recess of the radial inside).

In addition, the rotor laminated iron core can be manufactured by a method similar to that of the stator laminated iron core described above.

EXAMPLES

Next, Examples performed in order to check the action and effect of the present invention will be described.

Outline specifications of a product (stator laminated iron core) used are described below.

Outside diameter: ϕ223 mm
Distance L between through holes: 50 mm
Width w of yoke: 30 mm
Lamination thickness of laminated iron core: 50 mm
Young's modulus E of strip material: 180 GPa (180000 N/mm$^2$)

In this laminated iron core, the safety factor η was set at 2, and various conditions of the plate thickness t of the iron core piece, the number of iron core pieces blanked simultaneously (the number of simultaneously blanked pieces), the cross-sectional area S of each of the through holes and the strength T of the resin were changed, and the withstand load F of the resin and the reaction force W of the iron core piece were calculated, and it was examined whether or not the resin was cracked.

Table 1 shows results and the various conditions described above.

this manner (100 N/mm$^2$), the withstand load F of the resin became higher than the reaction force W of the iron core piece (F=200>W=138), and the crack in the resin could be eliminated.

Also, Example 3 is a result of the case of increasing the cross-sectional area of the through hole on the condition of Comparative Example 1.

By making the cross-sectional area of the through hole larger than that of Comparative Example 1 in this manner (6 mm$^2$), the withstand load F of the resin became higher than the reaction force W of the iron core piece (F=150>W=138), and the crack in the resin could be eliminated.

Subsequently, the case of laminating the plural iron core pieces blanked and formed from two stacked strip materials and manufacturing the laminated iron core will be described (the number of simultaneously blanked pieces: 2).

Comparative Example 2 is a result of the case of increasing the number of simultaneously blanked pieces to two on the condition of Example 3.

By increasing the number of simultaneously blanked pieces in this manner, the distortion amount δ became larger than that of Example 3 (0.50 mm). As a result, the withstand load F of the resin became lower than the reaction force W of the iron core piece (F=150<W=173), and the resin was cracked.

Example 4 is a result of the case of changing the kind of resin (resin strength: high) on the condition of Comparative Example 2.

TABLE 1

| | Plate thickness t (mm) | The number of simultaneously blanked pieces | Distortion amount δ (mm) | Cross-sectional area of through hole S (mm$^2$) | Strength of resin T (N/mm$^2$) | Withstand load of resin F (N) | Reaction force of iron core piece W (N) | Presence or absence of occurrence of crack in resin |
|---|---|---|---|---|---|---|---|---|
| Example 1 | 0.30 | 1 | 0.10 | 4 | 50 | 100 | 78 | Absence |
| Comparative Example 1 | 0.20 | 1 | 0.40 | 4 | 50 | 100 | 138 | Presence |
| Example 2 | 0.20 | 1 | 0.40 | 4 | 100 | 200 | 138 | Absence |
| Example 3 | 0.20 | 1 | 0.40 | 6 | 50 | 150 | 138 | Absence |
| Comparative Example 2 | 0.20 | 2 | 0.50 | 6 | 50 | 150 | 173 | Presence |
| Example 4 | 0.20 | 2 | 0.50 | 6 | 100 | 300 | 173 | Absence |
| Example 5 | 0.20 | 2 | 0.50 | 8 | 50 | 200 | 173 | Absence |

First, the case of laminating the plural iron core pieces blanked and formed from one strip material and manufacturing the laminated iron core will be described (the number of simultaneously blanked pieces: 1).

As shown in Example 1 of Table 1, in the case where the plate thickness t of the iron core piece was 0.30 mm, the plate thickness t was relatively thick, with the result that the distortion amount δ was small (0.10 mm). As a result, the withstand load F of the resin became higher than the reaction force W of the iron core piece (F=100>W=78), and a crack in the resin could be eliminated.

Comparative Example 1 is a result of the case of making the plate thickness t of the iron core piece thinner than that of Example 1 (0.20 mm).

By thinning the plate thickness t in this manner, the distortion amount δ became larger than that of Example 1 (0.40 mm). As a result, the withstand load F of the resin became lower than the reaction force W of the iron core piece (F=100<W=138), and the resin was cracked.

Example 2 is a result of the case of changing the kind of resin (resin strength: high) on the condition of Comparative Example 1.

By changing the kind of resin and making the strength T of the resin higher than that of Comparative Example 1 in By changing the kind of resin and making the strength T of the resin higher than that of Comparative Example 2 in this manner (100 N/mm$^2$), the withstand load F of the resin became higher than the reaction force W of the iron core piece (F=300>W=173), and the crack in the resin could be eliminated.

Also, Example 5 is a result of the case of increasing the cross-sectional area of the through hole on the condition of Comparative Example 2.

By making the cross-sectional area of the through hole larger than that of Comparative Example 2 in this manner (8 mm$^2$), the withstand load F of the resin became higher than the reaction force W of the iron core piece (F=200>W=173), and the crack in the resin could be eliminated.

The above results could check that the crack in the coupling resin resulting from the distortion in the iron core piece could be prevented by using the laminated iron core and the manufacturing method of the laminated iron core of the present invention.

The present invention has been described above with reference to the embodiment, but the present invention is not limited to the configuration described in the embodiment described above, and also includes other embodiments and modified examples contemplated within the scope of the matter described in the claims. For example, the case of constructing the laminated iron core and the manufacturing method of the laminated iron core of the present invention by combining a part or all of the respective embodiments and the modified examples described above is also included in the scope of right of the present invention.

What is claimed is:

1. A laminated iron core comprising:
 a plurality of laminated iron core pieces, each iron core piece formed and blanked from a strip material; and
 a plurality of coupling parts including through holes or recesses formed in a circumferential direction of the plurality of laminated iron core pieces so as to communicate in a lamination direction of the plurality of laminated iron core pieces, wherein
 the coupling parts are filled with resins to mutually couple the iron core pieces adjacent in the lamination direction, and
 the laminated iron core satisfies the following formula:

$$(T \times S)/\eta > \{(4 \times E \times \delta \times w \times t^3)/L^3\} \times n,$$

where T is a strength (N/mm$^2$) of the resin; S is a cross-sectional area (mm$^2$) of the coupling part or the resin; E is a Young's modulus (N/mm$^2$) of the strip material; $\delta$ is a distortion amount (mm) of the iron core piece; w is a width (mm) of the iron core piece in a radial direction; t is a plate thickness (mm) of the iron core piece; n is the number of laminated iron core pieces; L is a distance (mm) between the coupling parts adjacent in the circumferential direction; and $\eta$ is a safety factor greater than 1 and less than or equal to 3.

2. The laminated iron core according to claim 1, wherein the iron core pieces are blanked simultaneously, with a plurality of strip materials stacked.

3. The laminated iron core according to claim 1, wherein the coupling parts are through holes formed through a yoke of the laminated iron core.

4. The laminated iron core according to claim 1, wherein the coupling parts are recesses formed at a radial outside or inside of the laminated iron core.

5. The laminated iron core according to claim 1, wherein the coupling parts are winding slots formed between magnetic pole parts of the laminated iron core, and the resin is applied on a surface of the winding slots as a resin layer, and
 in the formula, S is a cross-sectional area (mm$^2$) of the resin layer.

6. A manufacturing method of a laminated iron core, the method comprising:
 blanking and laminating a plurality of laminated iron core pieces from a strip material;
 forming a plurality of coupling parts including through holes or recesses in a circumferential direction of the plurality of laminated iron core pieces so as to communicate in a lamination direction of the laminated iron core pieces; and
 filling the coupling parts with resins to mutually couple the iron core pieces adjacent in the lamination direction, wherein
 one or more of a kind of the resin, a material of the iron core piece and a shape of the iron core piece are set so as to satisfy the following formula:

$$(T \times S)/\eta > \{(4 \times E \times \delta \times w \times t^3)/L^3\} \times n,$$

where T is a strength (N/mm$^2$) of the resin; S is a cross-sectional area (mm$^2$) of the coupling part or the resin; E is a Young's modulus (N/mm$^2$) of the strip material; $\delta$ is a distortion amount (mm) of the iron core piece; w is a width (mm) of the iron core piece in a radial direction; t is a plate thickness (mm) of the iron core piece; n is the number of laminated iron core pieces; L is a distance (mm) between the coupling parts adjacent in the circumferential direction; and $\eta$ is a safety factor greater than 1 and less than or equal to 3.

7. The manufacturing method of the laminated iron core according to claim 6, wherein the iron core pieces are blanked simultaneously, with a plurality of strip materials stacked.

8. The manufacturing method of the laminated iron core according to claim 6, wherein the coupling parts are through holes formed through a yoke of the laminated iron core.

9. The manufacturing method of the laminated iron core according to claim 6, wherein the coupling parts are recesses formed at a radial outside or inside of the laminated iron core.

10. The manufacturing method of the laminated iron core according to claim 6, wherein the coupling parts are winding slots formed between magnetic pole parts of the laminated iron core, and the resin is applied on a surface of the winding slots as a resin layer, and
 in the formula, S is a cross-sectional area (mm$^2$) of the resin layer.

* * * * *